US008650472B2

(12) United States Patent
Yamaji et al.

(10) Patent No.: US 8,650,472 B2
(45) Date of Patent: Feb. 11, 2014

(54) CALENDAR OUTPUTTING METHOD AND APPARATUS FOR THE SAME, AND RECORDING MEDIUM

(75) Inventors: Kei Yamaji, Ashigarakami-gun (JP); Atsushi Misawa, Ashigarakami-gun (JP); Kazuhiro Mino, Ashigarakami-gun (JP); Yuko Suzuki, Ashigarakami-gun (JP); Karin Kon, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 937 days.

(21) Appl. No.: 12/410,043

(22) Filed: Mar. 24, 2009

(65) Prior Publication Data

US 2009/0249196 A1    Oct. 1, 2009

(30) Foreign Application Priority Data

Mar. 26, 2008 (JP) .................. 2008-081082

(51) Int. Cl.
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)

(52) U.S. Cl.
USPC ............ 715/209; 715/273; 715/255; 715/234

(58) Field of Classification Search
USPC .................. 715/273, 209, 255, 234
See application file for complete search history.

(56) References Cited

U.S. PATENT DOCUMENTS

| 6,088,708 | A | * | 7/2000 | Burch et al. .................. 715/229 |
| 6,530,067 | B2 | * | 3/2003 | Shih .............................. 716/55 |
| 6,636,650 | B1 | * | 10/2003 | Long et al. .................... 382/295 |
| 7,325,198 | B2 | * | 1/2008 | Adcock et al. ................ 715/722 |
| 2004/0125150 | A1 | * | 7/2004 | Adcock et al. ................ 345/810 |
| 2004/0169742 | A1 | * | 9/2004 | Shibutani et al. .......... 348/231.5 |
| 2005/0262164 | A1 | * | 11/2005 | Guiheneuf et al. ........... 707/203 |

(Continued)

FOREIGN PATENT DOCUMENTS

JP      2006-135430 A     5/2006

OTHER PUBLICATIONS

"Adobe Photoshop Album" URL: http://pc.watch.impress.co.jp/docs/2003/0311/adobe.htm (online), Mar. 11, 2003.

*Primary Examiner* — Stephen Hong
*Assistant Examiner* — Nicholas Hasty
(74) *Attorney, Agent, or Firm* — Sughrue Mion, PLLC

(57) ABSTRACT

A size of a region to be allocated to an image layout date is bigger than a size of a region to be allocated to a date other than the image layout date (image-not-layout date). An image to be allocated to the image layout date is enlarged so that a size of the image matches a size of an allocation region allocated to the image layout date, and the enlarged images is laid. Characters indicating the dates are arranged to regions allocated to previous dates, the image layout date, and following dates. Accordingly, a calendar with an attractive appearance can be generated by altering the layout of the dates and information to be output, even if a user has taken photographs on not so many days in the unit such as a month or a week.

22 Claims, 25 Drawing Sheets

(56) References Cited

U.S. PATENT DOCUMENTS

| | | |
|---|---|---|
| 2006/0220983 A1* | 10/2006 | Isomura et al. .............. 345/1.1 |
| 2008/0046814 A1* | 2/2008 | Harry et al. ................. 715/246 |
| 2008/0046815 A1* | 2/2008 | Shiimori ..................... 715/255 |
| 2008/0141145 A1* | 6/2008 | Klausmeier ................. 715/751 |
| 2009/0097361 A1* | 4/2009 | Nakamura et al. ............ 368/29 |
| 2009/0152349 A1* | 6/2009 | Bonev et al. ................ 715/753 |

* cited by examiner

FIG.3

| SUNDAY | MONDAY | TUESDAY | WEDNESDAY | THURSDAY | FRIDAY | SATURDAY | |
|---|---|---|---|---|---|---|---|
| G1 | G2 | G3 | G4 | G5 | G6 | G7 | |
| G8 | G9 | G10 | G11 | G12 | G13 | G14 | |
| G15 | G16 | G17 | G18 | G19 | G20 | G21 | ~T |
| G22 | G23 | G24 | G25 | G26 | G27 | G28 | |
| G29 | G30 | G31 | G32 | G33 | G34 | G35 | |
| G36 | G37 | G38 | G39 | G40 | G41 | G42 | |
| G43 | G44 | G45 | G46 | G47 | G48 | G49 | |

FIG.4

| G1 | G2 | 1 | 2 | 3 | 4 | 5 |
|---|---|---|---|---|---|---|
| 6 | 7 | 8 | 9 | 10 | 11 | 12 |
| 13 | 14 | G17 | G18 | G19 | G20 | G21 |
| G22 | G23 | G24 | G25 | G26 | G27 | G28 |
| G29 | G30 | G31 | G32 | G33 | G34 | G35 |
| G36 | G37 | G38 | G39 | G40 | G41 | G42 |
| G43 | G44 | G45 | G46 | G47 | G48 | G49 |

FIG.5

|   |   | 1 | 2 | 3 | 4 | 5 |
|---|---|---|---|---|---|---|
| G1 | G2 |   |   |   |   |   |
| 6 | 7 | 8 | 9 | 10 | 11 | 12 |
| 13 | 14 |   |   | G19 | G20 | G21 |
| G22 | G23 |   |   | G26 | G27 | G28 |
| G29 | G30 | G31 | G32 | G33 | G34 | G35 |
| G36 | G37 | G38 | G39 | G40 | G41 | G42 |
| G43 | G44 | G45 | G46 | G47 | G48 | G49 |

| G1 | G2 | 1 | 2 | 3 | 4 | 5 |
|---|---|---|---|---|---|---|
| 6 | 7 | 8 | 9 | 10 | 11 | 12 |
| 13 | 14 | 15 | | 16 | 17 | 18 |
| 19 | 20 | | | 21 | 22 | 23 |
| 24 | 25 | 26 | 27 | 28 | 29 | 30 |
| 31 | G37 | G38 | G39 | G40 | G41 | G42 |
| G43 | G44 | G45 | G46 | G47 | G48 | G49 |

FIG.9

| G1 | G2 | G3 | G4 | G5 | G6 | G7 |
|----|----|----|----|----|----|----|
| G8 | G9 | G10 | G11 | G12 | G13 | G14 |
| | | | | | | |
| G29 | G30 | G31 | G32 | G33 | G34 | G35 |
| G36 | G37 | G38 | G39 | G40 | G41 | G42 |
| G43 | G44 | G45 | G46 | G47 | G48 | G49 |

| G1 | G2 | 1<br>G3 | 2<br>G4 | 3<br>G5 | 4<br>G6 | 5<br>G7 |
|---|---|---|---|---|---|---|
| 6<br>G8 | 7<br>G9 | 8<br>G10 | 9<br>G11 | 10<br>G12 | 11<br>G13 | 12<br>G14 |
| 13 | 15 | | | 16 | 18 | 19 |
| 14 | Z3 | | | 17 | Z4 | Z5 |
| 20<br>G29 | 21<br>G30 | 22<br>G31 | 23<br>G32 | 24<br>G33 | 25<br>G34 | 26<br>G35 |
| 27<br>G36 | 28<br>G37 | 29<br>G38 | 30<br>G39 | 31<br>G40 | G41 | G42 |
| G43 | G44 | G45 | G46 | G47 | G48 | G49 |

FIG.24
| JANUARY |
|---|
| SUNDAY 6 |
| MONDAY 7 |
| TUESDAY 8 |
| WEDNESDAY 9 |
| THURSDAY 10 |
| FRIDAY 11 |
| SATURDAY 12 |
| JANUARY |
|---|
| SUNDAY 6 |
| MONDAY 7  ―― I1 |
| TUESDAY 8 |
| WEDNESDAY 9 |
| THURSDAY 10 |
| FRIDAY 11 |
| SATURDAY 12 |

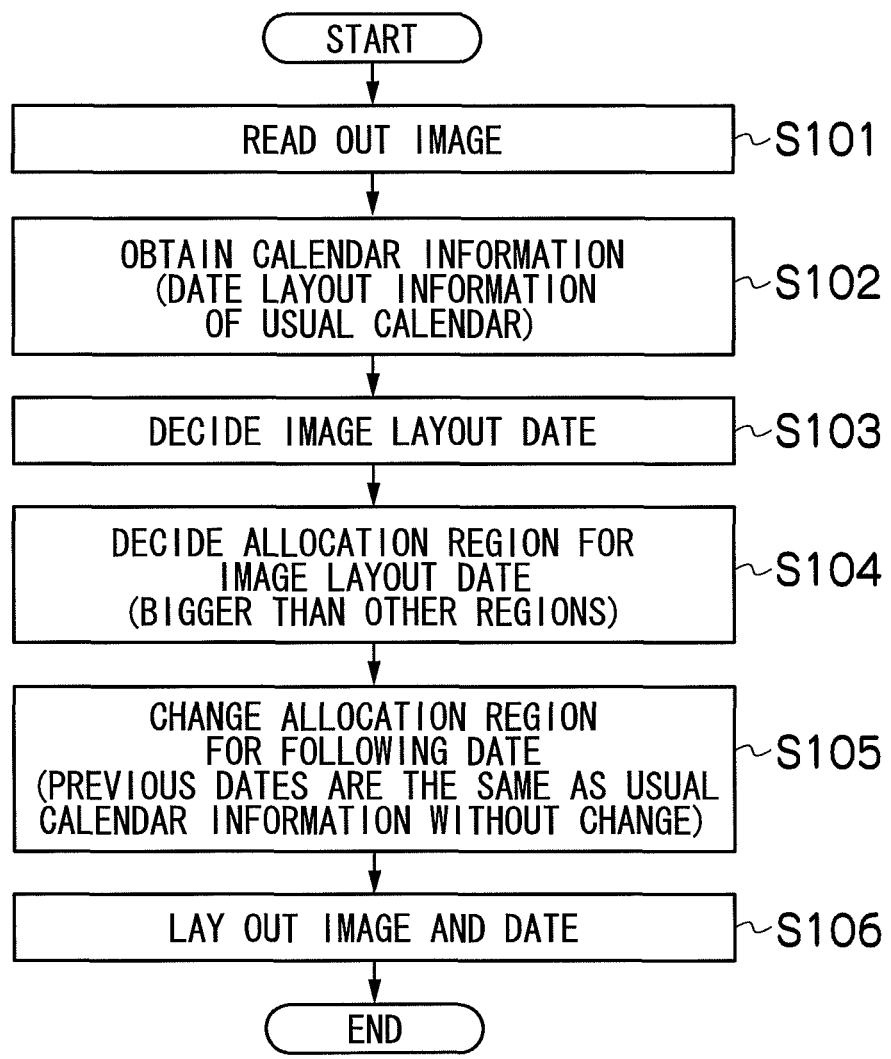

CALENDAR OUTPUTTING METHOD AND APPARATUS FOR THE SAME, AND RECORDING MEDIUM

BACKGROUND OF THE INVENTION

1. Field of the Invention

The present invention relates to outputting of a calendar in which one or more images are arranged.

2. Description of the Related Art

Techniques for outputting a calendar with an image combined have been devised recently. A technique for laying out an image in a specific date region in a calendar which is a region of the date when the image is the photographed so that the photographed date of the image can be checked, has been known ("Adobe Photoshop Album" [online], Mar. 11, 2003, [searched on Feb. 22, 2008], Internet <URL: http://pc.watch.impress.co.jp/docs/2003/0311/adobe.html>). Another technique for laying out an image in a region separated from the date region and displaying the image and the date in association with each other has been known (Japanese Patent Application Laid-Open No. 2006-135430).

SUMMARY OF THE INVENTION

However, if a user who does not take photographs so often uses the technique disclosed in ("Adobe Photoshop Album" [online], Mar. 11, 2003, [searched on Feb. 22, 2008], Internet <URL: http://pc.watch.impress.co.jp/docs/2003/0311/adobe.html>) and inserts images in date regions corresponding to the photographed dates of the images, the calendar looks unattractive with small images dispersed thereon. The technique disclosed in Japanese Patent Application Laid-Open No. 2006-135430 poses a problem that it is difficult to recognize the association between the date region and the position where the image is laid since the date region and the image layout position are separated.

The present invention is adapted in the view of the above-described problems. An object of the present invention is to generate a calendar with an attractive appearance by altering the layout of the dates and information to display even if a user has taken photographs on not so many days in the unit such as a month or a week.

The calendar outputting method according to an aspect of the present invention, includes: a step of obtaining an image; a step of obtaining a calendar template that defines an allocation region for each time unit on a calendar; a step of deciding an image layout position which is a time unit on the calendar to which the obtained image is to be laid; a step of deciding a pre-layout region which is a region allocated to each of time units existing before the image layout position in terms of time so that the pre-layout region matches a region allocated to time units existing before, defined by the calendar template; a step of deciding an image layout region which is a region to be allocated to the image layout position, in all of allocation regions defined by the calendar template, based on a region which is other than the pre-layout region and which is bigger than the allocation region for each of the time units defined by the calendar template; a step of deciding a post-layout region which is a region allocated to each of the time units existing after the image layout position in terms of time, in the allocation region for each of the time units on the calendar defined by the calendar template so that the post-layout region matches a region allocated to time units existing after the image layout region in terms of time; a step of laying out information indicating the time unit to the allocation region for each of the decided time units; a step of enlarging the image so that a size of the image matches a size of the image layout region, and laying out the enlarged image; and a step of outputting the calendar in which the information indicating the time unit and the enlarged image are laid.

According to the aspect of the present invention, a region bigger than a region allocated in the template is allocated to a time unit to which an image is laid on the calendar (for example, date), and the image is enlarged so that a size of the image matches a size of the allocated region, and laid. Accordingly, the aspect of the present invention can make the calendar which looks more attractive even when the number of images is few.

The image layout region is preferably decided so as to match a shape of the image.

Preferably, the calendar outputting method further includes a step of switching the output calendar and a usual calendar in which regions are allocated to all the time units according to the calendar template and in which the enlarged image is laid to the image layout position.

When an identical image layout position corresponds to a plurality of images, the size of the image layout region to be allocated to the identical image layout position corresponding to the plurality of images is preferably decided according to a total number of the plurality of images.

The size of the image layout region is preferably decided according to a total number of the images to be laid on the calendar.

The calendar outputting method according to another aspect of the present invention, includes: a step of obtaining an image; a step of obtaining a calendar template that defines an allocation region for each of first time units on a calendar and an allocation region for each of second time units, the second time unit being an upper time unit that includes the first time unit; a step of deciding a first image layout position being the first time unit to which the obtained image is laid, and a second image layout position being a second time unit that includes the first image layout position; a step of deciding an image-not-layout region to be allocated to an image-not-layout position being a second time unit that does not include the first image layout position so that the image-not-layout region matches a region that is allocated to the second time unit defined by the calendar template; a step of deciding a second image layout region to be allocated to the second image layout position, based on regions except for region allocated to the image-not-layout position, in region that is allocated to the second time unit defined by the calendar template; a step of deciding a first image layout region to be allocated to the first image layout position, based on a region that is within the second image layout region and that is bigger than the allocation region for the first time unit defined by the calendar template; a step of deciding an allocation region for each of first time units that are before and after the second image layout position in terms of time, within the image-not-layout region; a step of laying out information indicating the first time unit to the allocation region for each of the first time units; a step of enlarging the image so that a size of the image matches a size of the first image layout region and laying out the enlarged image; and a step of outputting the calendar in which the information indicating the first time unit and the enlarged image are laid.

According to the aspect of the present invention, the first image layout position that is the first time unit corresponding to the image (for example, date) and the second image layout position that is the second time unit including the second time unit (for example, week or month) are decided. Further, for the second time unit (image-not-layout region) other than the second image layout position, the allocation region is decided so as to correspond to the second time unit that is defined by the template. For the second image layout position, a region other than the allocation region for the image-not-layout regions is allocated (second image layout region). Within the second image layout region, the allocation region for the first image layout position is decided. Here, a region bigger than a region allocated to the first time unit in the template is allocated to the first image layout position, and the image is enlarged so that a size of the image matches a size of the allocation region, and laid.

Therefore, the calendar outputting method according to the aspect of the present invention can make the calendar which looks more attractive even when the number of images is few. Since the allocation region for the image-not-layout region is allocated so as to correspond to the second time unit that is defined by the template, the allocation regions for the second time units that exist before and after the second image layout position in terms of time, are not displaced (misaligned), even if the image is enlarged and laid.

The first image layout region is preferably decided so as to match the shape of the image.

The size of the first image layout region is preferably decided according to a total number of the images to be laid on the calendar.

When an identical first image layout position corresponds to a plurality of images, the size of the first image layout region to be allocated to the first image layout position corresponding to the plurality of images is preferably decided according to a total number of the plurality of images.

Preferably, the calendar outputting method further includes: a step of enlarging the first image layout region so that sizes of regions allocated to each of the first time units become equal, when the sizes of regions allocated to the first time units in the second image layout region are not identical; and a step of additionally laying out an image other than the laid image to an extra region that is resulted from the enlargement of the first image layout region.

Preferably, the calendar outputting method further includes: a step of extracting a specific subject from the image; and a step of laying out the extracted specific subject to the extra region. Preferably, a step of switching the output calendar and a usual calendar in which the regions are allocated to all the time units according to the calendar template and the enlarged image is laid to the image layout position is included.

Preferably, the calendar outputting method further includes a step of switching the output calendar and a usual calendar in which the regions are allocated to all the first time units according to the calendar template and in which the enlarged image is laid to the first image layout position.

The present invention also includes a program for causing a computer to execute the calendar outputting method according to any one of the aspects. Further, the present invention also includes a recording medium on which a program is stored, the program controlling a computer to execute the calendar outputting method according to any one of the aspects.

The calendar outputting apparatus according to further another aspect of the present invention includes: a device which obtains an image; a device which obtains a calendar template that defines an allocation region for each time unit on a calendar; a device which decides an image layout position which is a time unit on the calendar to which the obtained image is to be laid; a device which decides a pre-layout region which is a region allocated to each of time units existing before the image layout position in terms of time so that the pre-layout region matches a region allocated to time units existing before, defined by the calendar template; a device which decides an image layout region which is a region to be allocated to the image layout position, in all of allocation regions defined by the calendar template, based on a region which is other than the pre-layout region and which is bigger than the allocation region for each of the time units defined by the calendar template; a device which decides a post-layout region which is a region allocated to each of the time units existing after the image layout position in terms of time, among the allocation regions for each of the time units on the calendar defined by the calendar template so that the post-layout region matches a region allocated to time units existing after the image layout region in terms of time; a device which lays out information indicating the time unit to the allocation region for each of the decided time units; a device which enlarges the image so that a size of the image matches a size of the image layout region, and laying out the enlarged image; and a device which outputs the calendar in which the information indicating the time unit and the enlarged image are laid.

The calendar outputting apparatus according to further another aspect of the present invention includes: a device which obtains an image; a device which obtains a calendar template that defines an allocation region for each of first time units on a calendar and an allocation region for each of second time units, the second time unit being an upper time unit that includes the first time unit; a device which decides a first image layout position being the first time unit to which the obtained image is laid, and a second image layout position being a second time unit that includes the first image layout position; a device which decides an image-not-layout region to be allocated to an image-not-layout position being a second time unit that does not include the first image layout position so that the image-not-layout region matches a region that is allocated to the second time unit defined by the calendar template; a device which decides a second image layout region to be allocated to the second image layout position, based on regions except for region allocated to the image-not-layout position, in region that is allocated to the second time unit defined by the calendar template; a device which decides a first image layout region to be allocated to the first image layout position, based on a region that is within the second image layout region and that is bigger than the allocation region for the first time unit defined by the calendar template; a device which decides an allocation region for each of the first time units that are before and after the second image layout position in terms of time, within the image-not-layout region; a device which lays out information indicating the first time unit to the allocation region for each of the first time units; a device which enlarges the image so that a size of the image matches a size of the first image layout region and lays out the enlarged image; and a device which outputs the calendar in which the information indicating the first time unit and the enlarged image are laid.

According to any one of the aspects of the present invention, in a calendar, a region bigger that allocated by the template is allocated to a time unit (for example, date) to which an image is laid, the image is enlarged so that a size of the image matches a size of the allocation region, and the enlarged image is laid. Accordingly, a calendar looks more attractive can be made even when the number of images is few.

BRIEF DESCRIPTION OF THE DRAWINGS

FIG. 3 is a diagram showing an example of a calendar template;

FIG. 4 is a diagram showing an example of layout of previous dates;

FIG. 5 is a diagram showing an example of an allocation region for an image layout date;

FIG. 6 is a diagram showing an example of following dates;

FIG. 9 is a diagram showing an example of the allocation region for an image layout week;

FIG. 10 is a diagram showing an example of the allocation region for the image layout date in the image layout week;

FIG. 24 is a diagram showing an example of a case in which the present invention is applied to a calendar that shows dates of a week in a page; and FIG. 25 is a flowchart of the calendar creating processing according to the tenth embodiment.

DETAILED DESCRIPTION OF THE PREFERRED EMBODIMENTS

Figure 1:
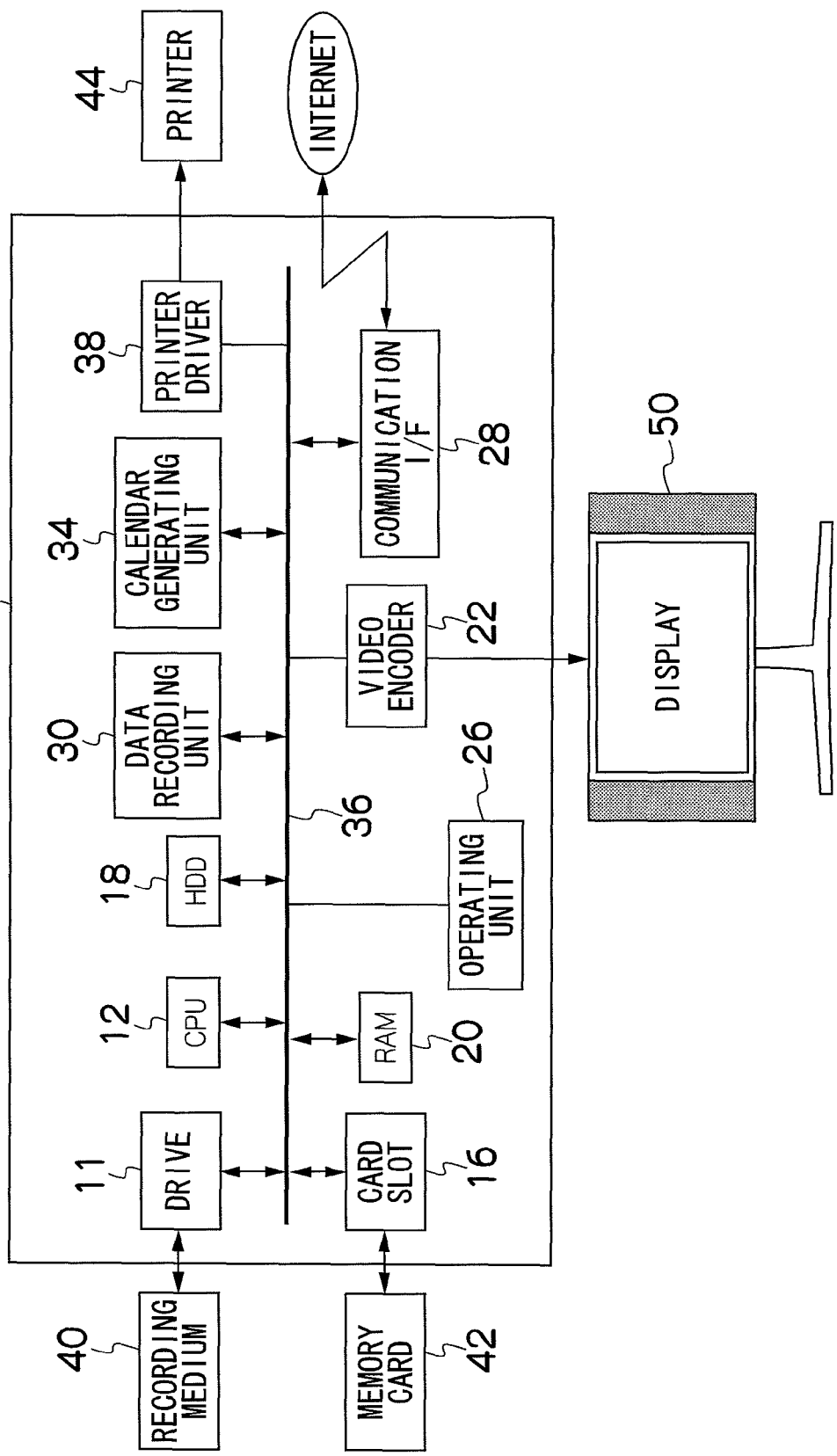
FIG. 1 is a block diagram of a calendar creating apparatus.

FIG. 1 is a block diagram showing an outlined configuration of a calendar creating apparatus 10 to which the present invention is applied. The calendar creating apparatus 10 reads out still image data (including a still image captured from a motion picture) stored in various types of recording medium 40 such as a CD or a DVD or a memory card 42, and creates a calendar (data for displaying year, months, dates weekly or monthly with an image associated with a specific year, month, date in a predetermined layout and design on a display unit, or a print medium such as a sheet of paper with an image printed in a predetermined layout and design) from the still image data as a material. The calendar creating apparatus 10 is operated with an operating unit 26 that has various operating devices including: pointing devices such as a mouse, touch pad, track ball and the like that allow a user to instruct movement of the pointer (cursor); a keyboard; and a touch panel.

The calendar creating apparatus 10 includes: a CPU 12 that controls over the calendar creating apparatus 10; a drive 11 for reading and writing data from and to a recording medium 40; a card slot 16 for reading and writing data from and to a memory card 42; a hard disk drive (storage medium) 18 (hereinafter, referred to as HDD 18) that stores read-out still image data, a program for controlling the calendar creating apparatus 10 and the like; a RAM 20 that functions as working memory when the CPU 12 performs various types of processing; a video encoder 22 that outputs video signals to a display 50 to be displayed thereon where the video signals are of a window and other various graphical user interfaces regarding image edition including a list of images or a template image to be described later that are stored in the RAM 20 or the like and of a pointer that moves on the window according to an input operation from the operating unit 26 including instructions about a direction of movement and a direction of speed; a communication I/F 28 for connecting the calendar creating apparatus 10 with the Internet and other networks; and a data recording unit (operation history recording device) 30 that is responsible for respective specialized processing, which are connected with each other via a bus 36. The CPU 12 controls over all of the components of the apparatus according to an operation program that is stored in the HDD 18.

To the calendar creating apparatus 10, a printer 44 for printing a specified still image on a sheet of plain paper, a sheet of photographic paper or the like via a printer driver 38 is connected.

The card slot 16 detachably holds a memory card 42 such as CompactFlash (registered trademark), SD card, Smart Media and the like and reads in or writes in the still image data and the like that are recorded in the memory card 42. With that, the calendar creating apparatus 10 can read out the still image data that has been imaged by a digital still camera. Other than a multi drive 14 and the card slot 16, a communication port such as USB or IEEE 1394 may be provided for the calendar creating apparatus 10 so that the calendar creating apparatus 10 can directly communicate with an electronic instrument such as a digital still camera and a PDA by cable.

The HDD 18 stores not only one or more still image data to make calendar materials, but also ornamental image data that is to be synthesized with those still image data in generating a calendar. The ornamental image data includes a template in which months and days in a specific year are arranged in one or a plurality of pages.

The respective still image data are stored in the HDD 18 in the forms of image file such as JPEG, TIFF, EXIF that is standardized for digital still cameras, and the like. In the image file, a data region for storing the still image data and a tag region for storing metadata that indicates the content of the still image data are prepared.

The communication I/F 28 connects the calendar creating apparatus 10 with the Internet for displaying an Internet home page on the display 50, transmitting and receiving image data by electronic mail (hereinafter, referred to as mail). The communication I/F 28 is a broadband modem or the like. The communication I/F 28 may be something that connects the calendar creating apparatus 10 with the Internet via an optical communication network, a cable network or the like. The communication I/F 28 is also capable of distributing a calendar created by the calendar generating unit 34 to a specific terminal over the Internet.

The data recording unit 30 and the calendar generating unit 34 are so-called coprocessors, and aids processing operations of the CPU 12 in respective specialized processing.

The system configuration shown in FIG. 1 is merely an example and the present invention can be implemented in another electronic instrument (for example, a cellular phone or a PDA) if only it has a configuration equivalent to that shown in FIG. 1.

Figure 2:
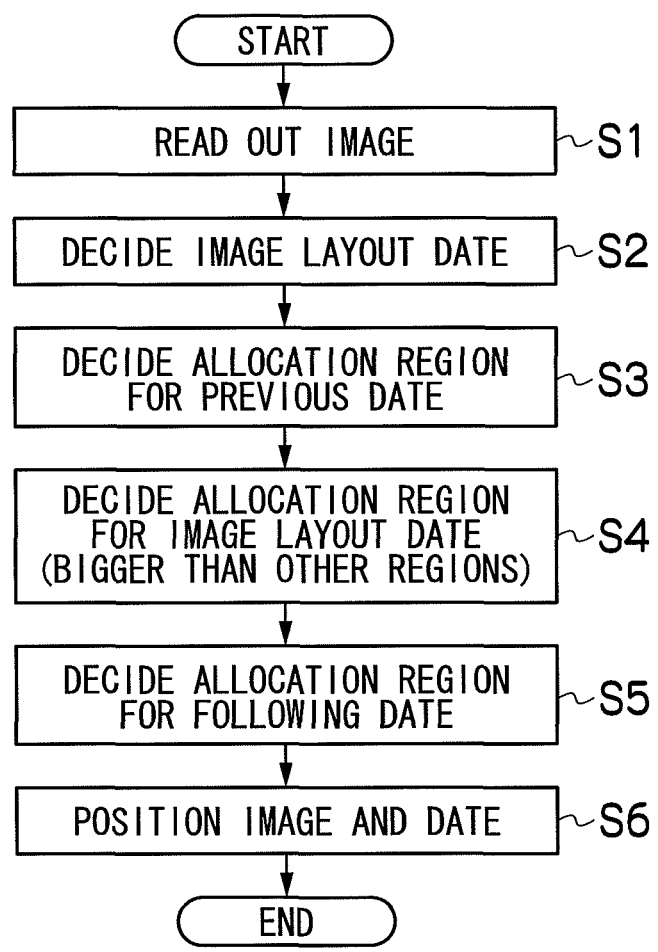
FIG. 2 is a flowchart of calendar creating processing of a first embodiment.

Now, a flow of calendar creating processing will be described along the flowchart shown in FIG. 2. The processing is performed by the calendar generating unit 34 (or the CPU 12). The program that describes the processing is stored in the HDD 18.

At S1, an image to be laid in the calendar is read out. The image may be a still image file such as JPEG, a captured image from a motion picture file, and the like.

At S2, the date on which the read-out image is to be laid (image layout date) is decided. For example, it is preferable to obtain the photographed date from additional information (meta information, tag information) on the read-out image and decide the obtained photographed date as the image layout date. Here, it is assumed that the photographed date "Jan. 15, 2008" is obtained from the meta information on the image and decided as the image layout date. The image and the image layout date need not to be one, respectively.

At S3, a region (position and size) on the calendar to be allocated to each of the dates previous to (before) the date corresponding to the image layout date (previous dates) is decided. The HDD 18 stores a calendar template T that is constituted of squared regions G1 to G49 arranged in a matrix of seven columns by seven rows with each region in an equal size and not overlapping each other as shown in FIG. 3, for example. The calendar template T is read out from the HDD 18, and then the dates from "Jan. 1, 2008" to "Jan. 14, 2008" that are the previous dates for the image layout date "Jan. 15, 2008" are matched with the corresponding days of week on the calendar template T (here, the dates correspond to Sunday, Monday, Tuesday, Wednesday, Thursday, Friday, and Saturday from the leftmost column to the rightmost column) and laid in respective square. Since Jan. 1, 2008 is Tuesday, the regions to be allocated to the dates from Jan. 1, 2008 to Jan. 14, 2008 are decided as the squares G3 to G16, respectively. As the result, the dates from Jan. 1, 2008 to Jan. 14, 2008 can be laid at the places as shown in FIG. 4.

The number, size, and shape of the regions in the template need not to be limited to those shown in the drawings. The regions may be increased in number or size if the screen or the output area on the print medium has room. The regions may be decreased in number or size, if otherwise. Although the all regions are in the same size and shaped square in FIG. 3, the regions may be different in size and need not be shaped square.

At S4, (the place and size of) the region on the calendar to be allocated to the image layout date is decided. Here, the size of the region to be allocated to the image layout date is bigger than that of the regions to be allocated to the dates other than the image layout date (image-not-layout date). Here, as shown in FIG. 5 as an example, it is assumed that the size and place of the region to be allocated to the image layout date Jan. 15, 2008 are equal to those of the region Z1 in which the squares G17, G18, G24, and G25 merged.

At S5, (the size and place of) the regions on the calendar to be allocated to the dates after the image layout date (following dates) are decided. As shown in FIG. 6, the regions to be allocated to the following dates from Jan. 16, 2008 to Jan. 31, 2008 are decided as such, for the dates from Jan. 16, 2008 to Jan. 20, 2008, the regions are decided as the squares G19 to G23, and for the dates from Jan. 21, 2008 to Jan. 31, 2008, the regions are decided as the squares G26 to G36, respectively.

At S6, the image to be laid to the image layout date is enlarged to match the size of the allocation region for the image layout date and laid there. The characters indicating the dates are laid in the layout regions allocated to the previous dates, the image layout dates, and the following dates, respectively. The colors of the characters may vary according to the date of week such as the characters indicating the dates corresponding to Sundays and holidays are in red, the characters indicating the dates correspond to Saturdays are in blue, and the characters indicating the dates correspond to weekdays are in black. A line is drawn on the boundary between regions to be allocated to the dates to emphasize the separation between the dates. The days of week, months and year are laid as required.

Figure 7:
FIG. 7 is a diagram showing an example of a calendar that is completed through the calendar creating processing according to the first embodiment.

As the result, the calendar as shown in FIG. 7 is completed. In FIG. 7, an image I1 in a size bigger than each of the regions allocated to surrounding dates is output to the region Z1 allocated to January, 15. When the calendar creating apparatus is a printing kiosk, the calendar is previewed on the display 50. When the content of the calendar is confirmed, the calendar can be printed on the print medium by the printer 44 or transferred to the recording medium 40 such as DVD that can record the calendar as image data according to the user's instruction. When the calendar creating apparatus is adapted to receive an order for a calendar from the terminal that is connected to the calendar creating apparatus from outside over the Internet, the calendar creating apparatus may convert the preview of the calendar into a Web page that can be displayed on the terminal instead of the display 50 and transmit to the terminal. Alternatively, the completed calendar may be displayed as a merely calendar displaying function of the electronic instrument such as a cellular phone or a digital camera without being prepared for being output to the recording medium or the print medium.

When a plurality of images are to be laid, the processing from S2 to S5 is repeated for each image, and after the allocation regions for all the dates are decided, S6 is performed. The free regions where no date is laid (for example, G1, G2, G37 to G42) may be left as free regions or the squares with no date to be allocated may have a line drawn on the frames.

In FIG. 7, although the squares G43 to G49 of the seventh week where no dates are laid (the regions reserved in preparation for an enlarged image to be laid) have no lines laid on the frames, G1, G2, and G37 to G42 that are in the weeks where dates are laid have lines drawn on only the frames. In addition, a prepared image or graphic (for example, the dates in the previous month "December 30" and "December 31" in grayed out characters in G1 and G2, and the dates in the next month "February 1" to "February 6" in grayed out characters in G37 to G42) may be laid.

As such, with the region to be allocated to the date to which the image is to be laid made bigger than regions to be allocated to the other dates, the image corresponding to the date on the calendar can be presented with high visibility and the more attractive look. Accordingly, the visibility of the dates, which is the basic function as a calendar, can be prevented from being degraded as much as possible.

Second Embodiment

In the first embodiment, the association between the dates and the day of week after the dates, to which an image is to be laid, is lost. In order to prevent such incidents, the processing below should be performed.

Figure 8:
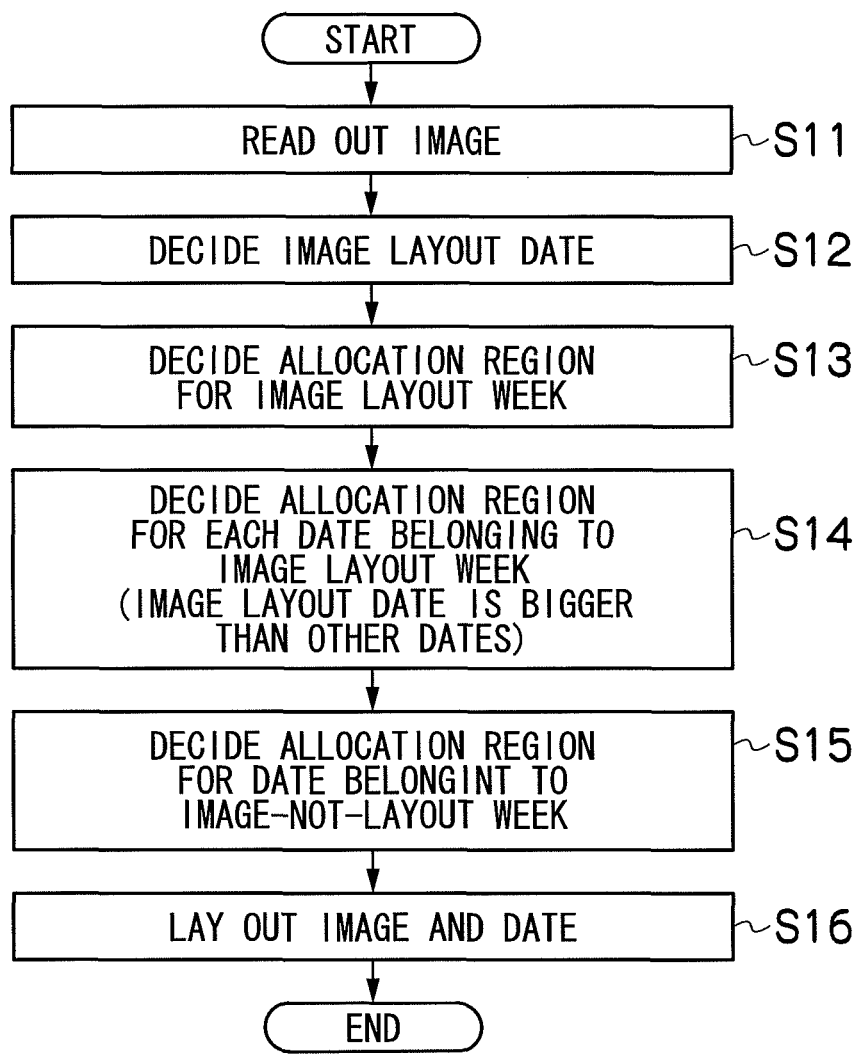
FIG. 8 is a diagram showing an example of the calendar creating processing according to a second embodiment.

FIG. 8 is a flowchart of a calendar-layout adjustment processing according to the second embodiment.

S11 to S12 are the same as S1 to S2.

At S13, a region on the calendar to be allocated to the image layout week (place and size) is decided by taking the week to which the image layout date belongs (image layout week) as a unit. As shown in FIG. 9, the region Z2, in which the squares G15 to G28 are merged, is decided as the allocation region for the week from January 13 to January 19, to which the image layout date January 15 belongs.

At S14, the regions to be allocated to the dates that belong to the image layout week are decided within the region allocated to the image layout week. The size of the region to be allocated to the image layout date is bigger than the size of the other dates. Here, as shown in FIG. 10, a region Z3, in which the squares G16, G17, G18, G23, G24, and G25 are merged, is allocated to the image layout date January 15. As for the image-not-layout date that belong to the image layout week, G15 is allocated to January 13, G22 is allocated to January 14, G19 is allocated to January 16, G26 is allocated to January 17, the region Z4 in which G20 and G27 are merged is allocated to January 18, and the region Z5 in which G21 and G28 are merged is allocated to January 19. Although the regions, in which two squares are merged, are allocated to January 18 and 19 in order not to make any blank associated with no date inserted between the dates, the regions each of which consists of one square may be allocated to the dates.

At S15, the regions to be allocated to dates that belong to the weeks other than the image layout week (image-not-layout week) are decided. Here, the squares G3 to G14 are decided as the regions to be allocated to the following dates from Jan. 1, 2008 to Jan. 12, 2008, and the squares G29 to G40 are decided for the dates from Jan. 20, 2008 to Jan. 31, 2008.

At S16, the image to be laid to the image layout date is enlarged to match the size of the allocation region for the image layout date and laid. The characters indicating the dates are laid to the layout regions that are decided to the respective dates. Since the days of week for the dates of the image layout week become out of the usual order (i.e., the layout of the days of week are displaced or misaligned), the dates of the image layout week preferably appear in different colors.

Figure 11:
FIG. 11 is a diagram showing an example of an image laid to the image layout date.

As the result, the calendar as shown in FIG. 11 is completed. In FIG. 11, the image I1 is allocated to the date January 15, enlarged to match the region Z3, which is bigger than each of the allocation regions for the surrounding dates, and output. Although the calendar is previewed on the display 50, when the content of the calendar is confirmed, the calendar can be transferred to the print medium by the printer 44 in response to the user's instruction. The calendar may be used as merely a calendar display function.

Since the embodiment is adapted to decide the weekly allocation region for the week, to which no image layout date belongs, to ensure that the region to be allocated to the image layout date is bigger than the region to be allocated to the other dates, the embodiment can prevent the association between the dates and the days of week on the calendar from being lost.

Third Embodiment

More preferably, at S4 of the first embodiment and at S14 of the second embodiment, the shape of the region to be allocated to the image layout date is decided to match the shape of the image.

Figure 12:
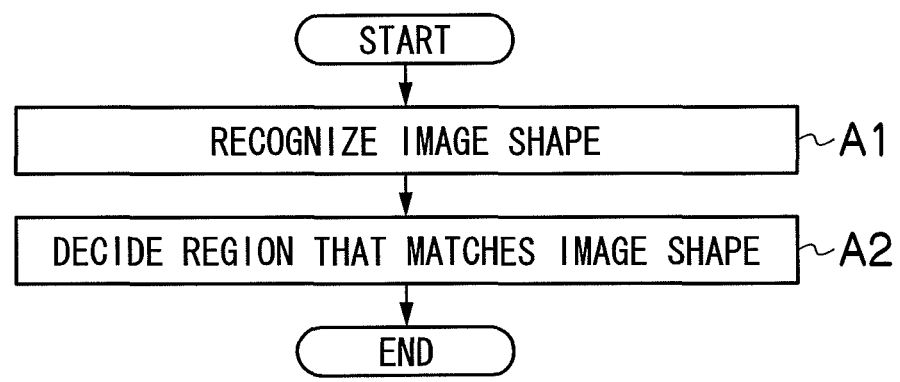
FIG. 12 is a flowchart of a subroutine according to a third embodiment.

For example, the subroutine as shown in FIG. 12 is provided at the above-described steps S4 and S14.

First, at A1, the shape of the image to be laid is recognized. The shape of the image may be a portrait shape, a landscape shape, a square and the like.

Figure 13:
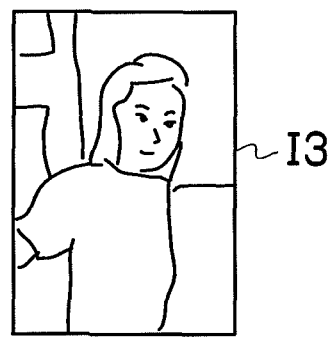
FIG. 13 is a diagram showing an example of a portrait shaped image.
Figure 14:
FIG. 14 is a diagram showing an example of a region allocated to match the portrait shaped image.

At A2, the region in the shape to match the shape of the recognized image is allocated as the region for the image layout date. For example, as shown in FIG. 13, when the shape of an image 13 to be allocated to the image layout date January 18 is a portrait shape, a region Z6, in which the squares G20 and G27 are merged as shown in FIG. 14, is allocated. Although not shown, when the shape of an image is a landscape shape, a region, in which the squares arranged side by side are merged, is preferably allocated.

In that manner, the embodiment can prevent the case in which, although a big region is allocated to lay out the image, unused margin is left because the shape of the region and the shape of the image to be laid in the region do not match. That means the embodiment can effectively use the regions on the calendar.

Fourth Embodiment

At S4 of the first embodiment and at S14 of the second embodiment, according to the number of the images, the regions to be allocated to the image layout dates may be so many that all the dates cannot be contained in all of the output regions in calendar template of one page, or the allocation regions for the image-not-layout date becomes extremely small that the visibility of the dates may be degraded.

Figure 15:
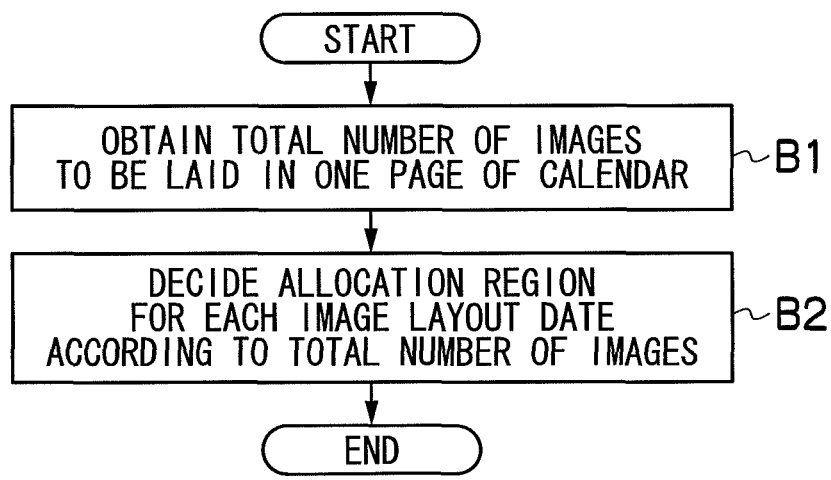
FIG. 15 is a flowchart of a subroutine according to a fourth embodiment.

Then, the subroutine as shown in FIG. 15 is provided at the above-described steps S4 and S14.

At B1, the total number of the images to be laid in a page of the calendar is obtained.

At B2, the regions to be allocated to the image layout dates corresponding to the images are decided for the images according to the total number of the images. If the number of the image is one, the squares are allocated to the dates in the image layout week (see the second embodiment) and the number of the remaining squares is determined so that the remaining squares are decided as the regions to be allocated to the dates of the image layout week.

Figure 16:
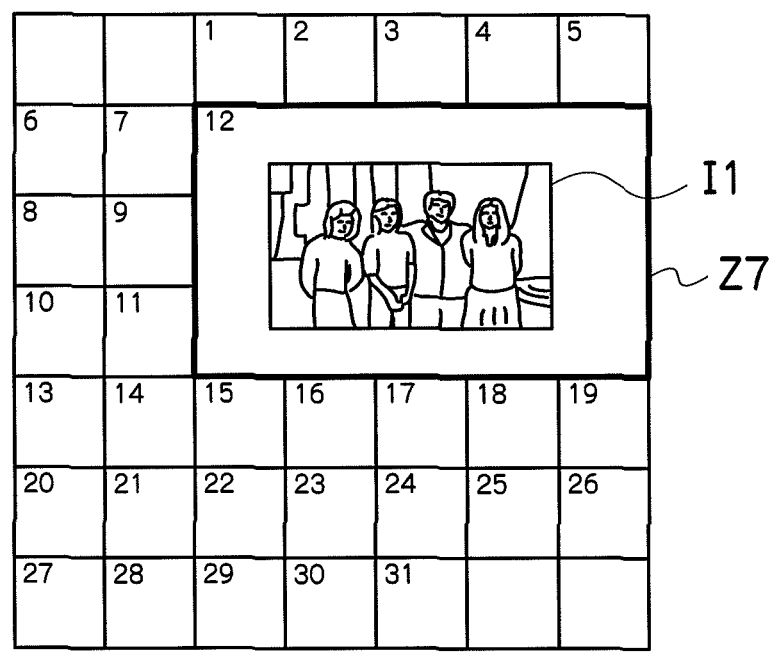
FIG. 16 is a diagram showing an example of the allocation region for only one image.

In FIG. 16, the image layout date corresponding to the only one image I1 is January 12, and the image layout week is from January 6 to January 12. In the template shown in FIG. 3, since the dates for up to 49 days=seven weeks can be laid, the squares of G3 to G7, G29 to G35, G36 to G42, G 43 to G49 are allocated to dates belonging to four weeks (24 days in total) of the image-not-layout week such as from January 1 to January 5, from January 13 to January 19, from January 20 to January 26, and January 27 to January 31. Then, extra squares for 7−4=3 weeks (G1 to G35) remain. As for the extra squares for the three weeks, first, the regions that belong to the image layout week and are allocated to the dates previous or following to the image layout date are decided. Then, the remaining extra squares are allocated to the regions corresponding to the image layout date.

In FIG. 16, for the dates that belong to the image layout week and that are previous to (before) the image layout date January 6 to January 11, the squares of G8, G9, G15, G16, G22, and G23 are decided as the allocation region. For the image layout date January 12, a region Z7, in which G10 to G14, G17 to G21, and G24 to G28 are merged, is decided as the allocation region. The size of the image I1 is enlarged to match the region Z7.

When the number of images is two and the number of the image layout weeks is two, the allocation region for the image layout date is smaller than the above-described region.

It is assumed that the images to be laid are I1 and I2, the image layout date of I1 is January 6, and the image layout date of I2 is January 23. In that case, the image-not-layout weeks are three weeks such as from January 1 to January 5, from January 13 to January 19, and from January 27 to 31. The image layout weeks are two weeks such as from January 6 to January 12, and January 20 to January 26.

When the squares of G3 to G7, G22 to G28, and G43 to G49 are allocated to the dates that belong to the image layout week such as from January 1 to January 5, January 13 to January 19, January 27 to January 31, extra squares for 7−3=4 weeks (G8 to G21, G29 to G42) remain.

For the extra squares, first, allocation to the image layout week is decided. Here, G8 to G21 are allocated to January 6 to January 12, and G29 to G42 are allocated to January 20 to January 26, respectively. If the extra squares are not separated and serially arranged, three weeks may be allocated to one set of squares and one week may be allocated to the other set of squares. The settings may be performed in advance or real time by user's input on the operating unit 26.

Sequentially, the regions to be allocated to the dates of the image layout week are decided for the extra squares that have been allocated as described above, similar to the case in which the number of the image is one.

Figure 17:
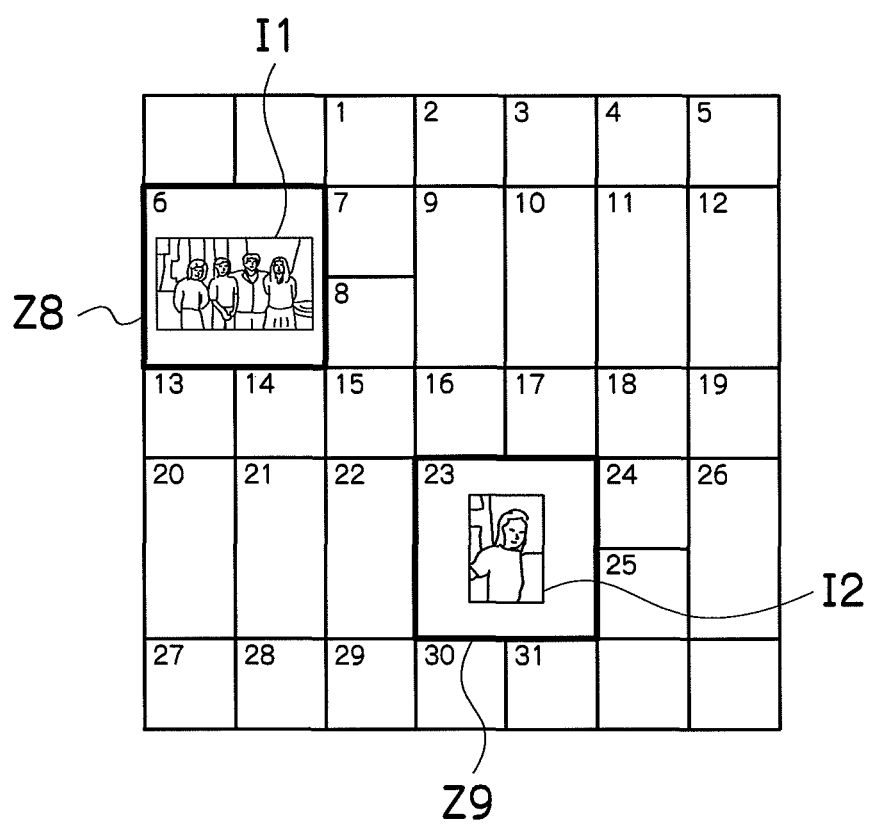
FIG. 17 is a diagram showing an example of the allocation region corresponding to a plurality of images.

In FIG. 17, as for the first image layout week January 6 to January 12, a region Z8, in which the squares of G8, G9, G1, and G16 are merged, is decided as the allocation region for the image layout date January 6; and a region in which G10, G17, G11, and G18 are merged, a region in which G12 and G19 are merged, a region in which G13 and G20 are merged, and a region in which G14 and G21 are merged, are decided as the allocation region for the dates following to January 6 such as January 7 to January 11. The size of the image I1 is enlarged to match the region Z8. As for the second image layout week January 20 to January 26, a region in which G29 and G36 are merged, a region in which G30 and G37 are merged, a region in which G31 and G38 are merged are allocated to January 20 to 22. To the image layout date January 23, a region Z9, in which G32, G33, G39, and G40 are merged, is allocated. The size of the image I2 is enlarged to match the region Z9. To January 24 to January 26, a region in which G34, G41, G35, and G42 are merged is allocated.

The regions Z8 and Z9 have the biggest regions remaining after the dates are laid. The embodiment is adapted to make the image corresponding to the date as big as possible so that the user can easily understand even if the images increase.

Fifth Embodiment

If a plurality of images correspond to an image layout date, the embodiment can keep the region for the image layout date big by allocating the regions to the image-not-layout dates and allocating the remaining regions to the image layout dates with the same concept as that of the fourth embodiment.

It is assumed that three images correspond to January 12. In that case, the image layout week is from January 6 to January 12, and the image-not-layout week is from January 1 to January 5, January 13 to January 19, January 20 to January 26, and January 27 to January 31. First, to the dates of the image-not-layout week, the squares are allocated one by one. Specifically, G3 to G7 are allocated to January 1 to January 5, G29 to G35 are allocated to January 13 to January 19, G36 to G42 are allocated to January 20 to January 26, and G43 to G47 are allocated to January 27 to January 31. As the result, the extra squares for three weeks remain.

Next, to the image-not-layout dates (January 6 to 11) in the image layout week, the extra squares after the allocation of the image-not-layout week is performed are allocated one by one. Then, the extra squares that are not allocated to the image-not-layout dates among the squares allocated to the image layout week are merged, and the merged squares are allocated to the image layout date. Then, a plurality of images are allocated to the allocation region of the image layout date.

Figure 18:
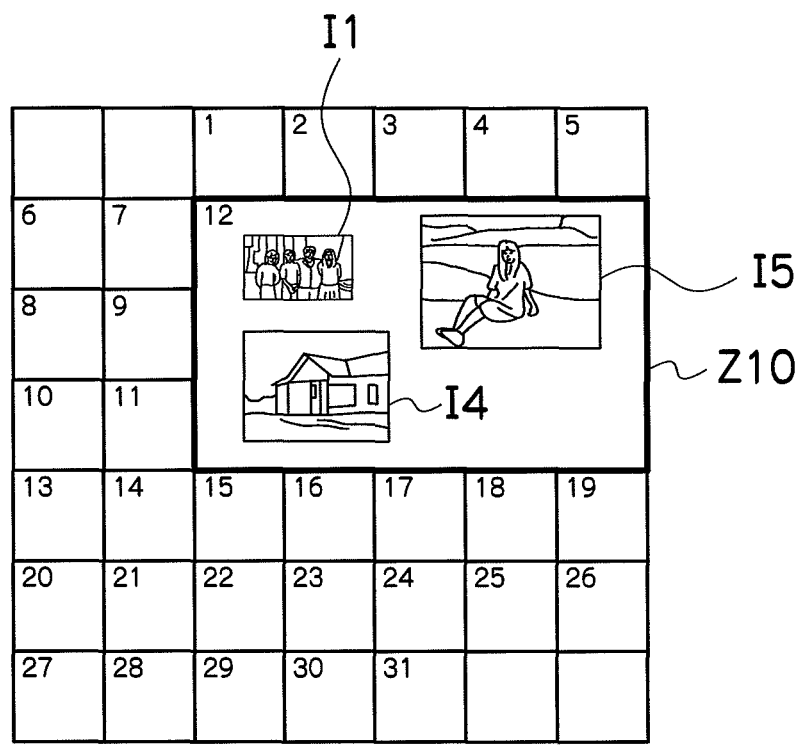
FIG. 18 is a diagram showing an example of a calendar that is completed through the calendar creating processing according to a fifth embodiment.

FIG. 18 shows an example of the calendar created in the above-described manner. The image may be laid out in any way. If the region has enough size, the images may be enlarged. The images need not to be in the uniform size. Some images may be reduced in size to reserve the space for the other image, and an important image (for example, a portrait) can be enlarged for the reserved space.

If the same date corresponds to a plurality of images to be laid to the calendar, the date is shown as big as possible for the user to easily understand.

Sixth Embodiment

When the size of the region to be allocated to the image layout date is fixed, the image-not-layout dates in the image layout week are uneven in sizes, which makes the calendar look unattractive.

Figure 19:
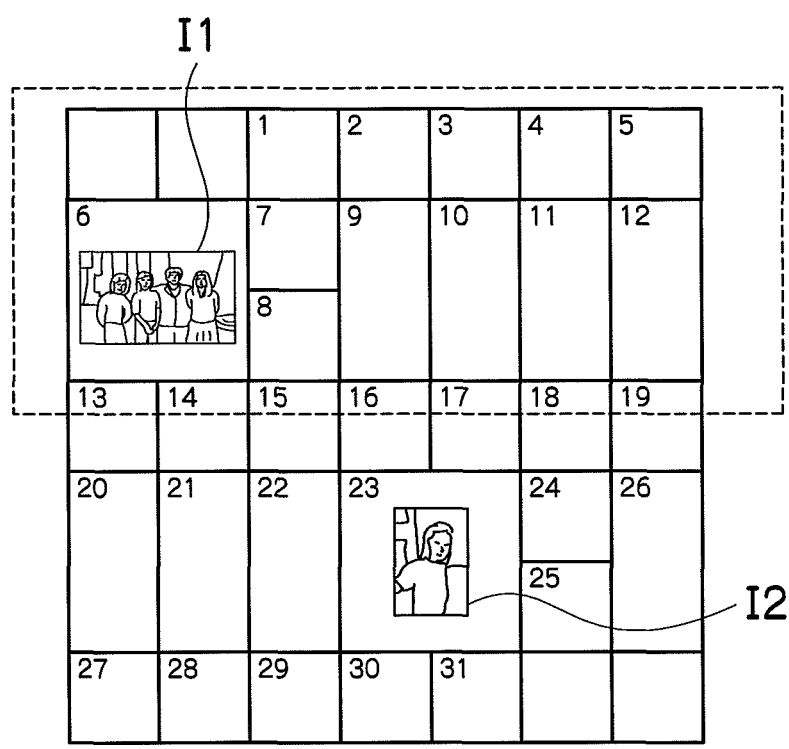
FIG. 19 is a diagram showing an example of a calendar that shows image-not-layout dates in each image layout week with uneven sizes.

As shown in FIG. 19, when the size of the region to be allocated to the image layout date is such that the four squares are merged to make a bigger square, and the regions to be allocated to the following dates of the image layout week are such that a region in which two squares are merged and a region made of one square are mixed, the calendar lacks coherence.

Then, the embodiment is, similar to the fifth embodiment, adapted to allocate the same size equally to the image-not-layout dates, merge the resulted remaining regions that are adjacent to each other and is able to be merged, and allocate the merged regions to the image layout date. Since the shape of the image layout region does not necessarily match the shape of the image corresponding to the date, the other suitable images are laid with the image that is originally to be laid to fill the margin of the region for the image to be laid. Any image may be used to fill the margin. For example, an image taken on the same day in a previous year (the year before, the year before last, and the like) may be used. The image taken in the previous year may be marked with the frame with a design different from that of the image taken in the current year to show that the image has taken in the different year. Alternatively, the user-specified-image may be used to fill the margin.

Figure 20:
FIG. 20 is a diagram showing an example of a calendar that shows image-not-layout dates in each image layout week made the same in size by the calendar creating processing according to the sixth embodiment.

In FIG. 20, since January 6 is the image layout date, the squares G12, G19, G13, G20, G14, and G21 are allocated to the dates other than January 6, i.e, the image-not-layout date, in the image layout week January 7 to January 12, respectively, and the remaining squares except for those which cannot be merged (G48, G49), G8, G9, G10, G11, G15, G16, G17, and G18 are merged and allocated to the image layout date. In that manner, the embodiment can prevent the image-not-layout dates from having uneven sizes.

If the image that is originally to be laid corresponding to Jan. 6, 2008 is only the image I2, margins are resulted at both sides of the image I2, since the above-described merged region is a landscape shape. Then, another image I6 is selected and laid to the allocation region for the image layout date with the image I2 to fill the margins. The image I6 may be not only that taken on the same day in a previous year but also the image of a specific subject (person, animal, building and the like) detected from the already laid image I2 with the region including the detected specific subject saved as different image data, for example.

Seventh Embodiment

It is also possible to make the image look more attractive with the regions allocated to the image layout dates and the image-not-layout dates in the uniform size.

Figure 21:
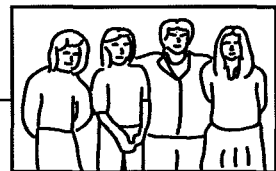
FIG. 21 is a diagram showing an example of a calendar on which a person region is laid to the image layout date by the calendar creating processing according to the seventh embodiment.

For example, a person is detected from the image, the region including the detected person is cut out from the original image, and the cut out person region is laid to the image layout date (see FIG. 21). In that manner, the embodiment can display a person region, which is an important part of the image, without requiring the size of the layout region of the image layout date to be adjusted. When a subject other than a person can be detected, that subject may be cut out. A technique for detecting a subject may be a method using pattern matching such as that described in Japanese Patent Application Laid-Open No. 2007-249526 filed by the applicant.

Alternatively, a range may be specified from the operating unit 26, the specified range may be cut out, and the cut out range may be laid to the image layout date. For the case in which a plurality of persons are cut out, the embodiment may be adapted to register the date of the image for each person. If father is cut out from a group photograph of a family including father, mother, older daughter, and younger daughter, and the father's birthday is registered to the cut out region including father as the image layout date, the father's image can be laid on the father's birthday on the calendar.

The fifth embodiment may be adapted to replace the original image with a cut out region including a person and lay out the region instead of reducing the image in size for the purpose of reserving a space for another image. The sixth embodiment may be adapted to lay out a region including a person that is extracted from the image that is originally to be laid as well as the original image in the allocation region for the image layout date for the purpose of filling the margin.

Eighth Embodiment

The present invention may be adapted to switch between the display of a usual calendar with a uniform region (a square) allocated to each date without regard of the presence of the image layout date and the display of a calendars that are output through the processing of the above-described first to sixth embodiments in response to the user's input of the instruction on the operating unit 26. Alternatively, the present invention may be adapted to switch the display among the calendar displays that are output through the processing of the above-described first to sixth embodiments in response to the user's input of the instruction on the operating unit 26.

Figure 22:
FIG. 22 is a schematic diagram showing the case in which a calendar with an enlarged image and a usual calendar can be switched each other.

Particularly, when the calendar with an enlarged image as shown in FIG. 22 and a usual calendar can be switched each other, the user can check the content of the laid image before previewing the calendar.

Ninth Embodiment

In the above-described embodiment, the date is the unit for checking whether the image is to be laid or not; though, week, month, year can be used for the unit instead of date.

Figure 23:
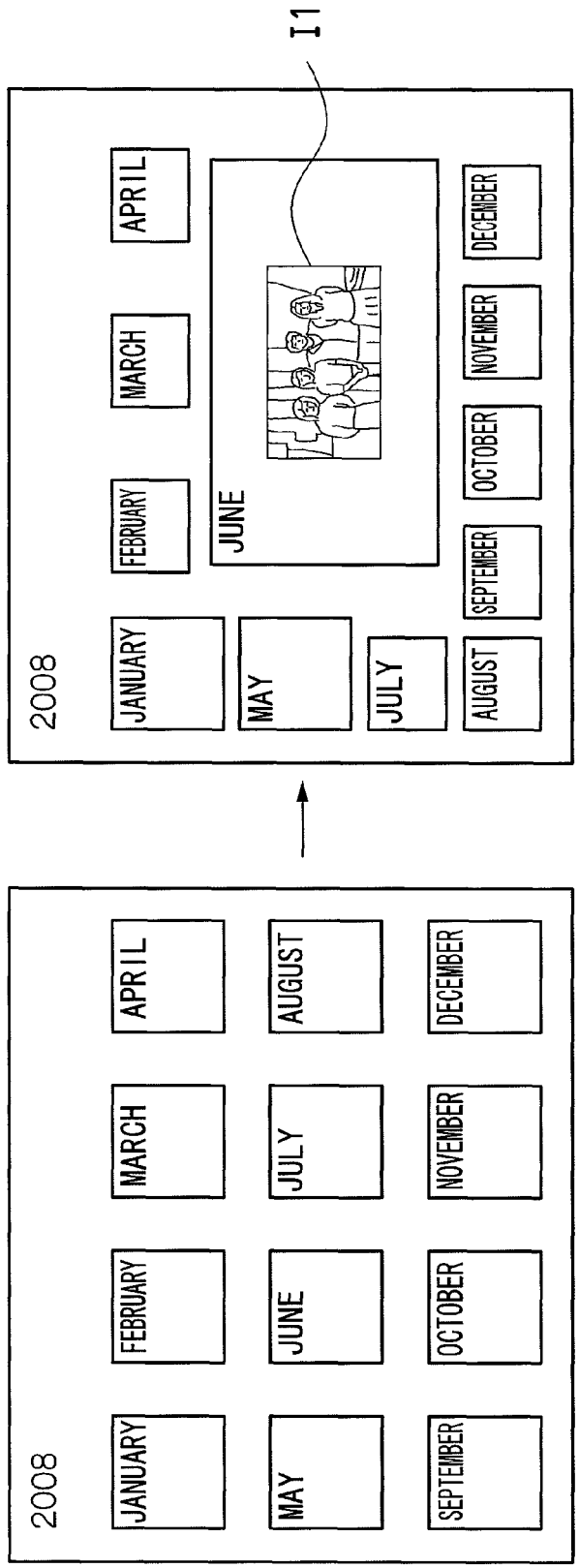
FIG. 23 is a diagram showing an example of a case in which the present invention is applied to a calendar that shows months of a year in a page.

In the case of a calendar in which all the dates belonging to the months from January to December are displayed in one page as shown in FIG. 23, a size adjusted calendar in which a region allocated to the month to which the image is to be laid (image layout month) is bigger than that allocated to the month to which no image is to be laid (image-not-layout month) can be output. The present invention may also be adapted to switch the display and output of a calendar between a usual calendar in which the same square as that described above is allocated to each month and the size adjusted calendar in response to an operation to the operating unit 26.

The allocation region needs not to be decided by using a square as the least unit.

As shown in FIG. 25, in the case of a weekly calendar in which each of the weeks belonging to a specific month is displayed in a page, the size of the region may be adjusted by moving the boundary between the dates. Specifically, it is essential that the region allocated to the date to which the image is to be laid is bigger than that allocated to any of the other dates and the image is enlarged to match the allocation region. It is also possible to switch the display of a calendar among the calendar that displays months of a year in a page (FIG. 23); the calendar that displays dates of a week in a page (FIG. 24); a usual calendar; and the calendars that are output through the processing of the first to sixth embodiments in response to the user's input of the instruction on the operating unit 26.

Tenth Embodiment

In the calendar creating processing of the first embodiment, after the image layout date is decided (S2), the allocation regions for the previous dates are decided (S3). Since the allocation regions for the previous dates does not regard to the position of the image layout date (i.e., the allocation regions for the previous dates are the same as those of a usual calendar), however, it is preferable to decide the allocation regions for the previous dates as those arranged in a usual calendar that are obtained at S102 and decide the allocation regions for following dates separately from the layout of the usual calendar (S105).

While examples and embodiments of the present invention have been explained in detail, the present invention is not limited to the above, needless to say, various improvements and modifications may be added without departing from the scope of the present invention.

What is claimed is:

1. A calendar outputting method comprising:
   a step of obtaining an image;
   a step of obtaining a calendar template that defines an allocation region for each time unit on a calendar;
   a step of deciding an image layout position which is a time unit on the calendar to which the obtained image is to be laid;
   a step of deciding a pre-layout region which is a region allocated to each of time units existing before the image layout position in terms of time so that the pre-layout region matches a region allocated to time units existing before, defined by the calendar template;
   a step of deciding an image layout region which is a region to be allocated to the image layout position, in all of allocation regions defined by the calendar template, based on a region which is other than the pre-layout region and which is bigger than the allocation region for each of the time units defined by the calendar template, the region being obtained by merging a plurality of the allocation regions for each of the time units;
   a step of deciding a post-layout region which is a region allocated to each of the time units existing after the image layout position in terms of time, in the allocation region for each of the time units on the calendar defined by the calendar template so that the post-layout region matches a region allocated to time units existing after the image layout region in terms of time;

a step of laying out information indicating the time unit to the allocation region for each of the decided time units;

a step of enlarging the image so that a size of the image matches a size of the image layout region, and laying out the enlarged image;

a step of outputting the calendar in which the information indicating the time unit and the enlarged image are laid, a step of determining an output area of at least one of an output screen and an output medium for display of the calendar, and a step of adjusting at least a number and an area of the allocation regions based on the determined output area, wherein at least one of the number and area is increased as the determined output area increases.

2. A calendar outputting method comprising:

a step of obtaining an image;

a step of obtaining a calendar template that defines an allocation region for each of first time units on a calendar and an allocation region for each of second time units, the second time unit being an upper time unit that includes the first time unit;

a step of deciding a first image layout position being the first time unit to which the obtained image is laid, and a second image layout position being a second time unit that includes the first image layout position;

a step of deciding an image-not-layout region to be allocated to an image-not-layout position being a second time unit that does not include the first image layout position so that the image-not-layout region matches a region that is allocated to the second time unit defined by the calendar template;

a step of deciding a second image layout region to be allocated to the second image layout position, based on regions except for region allocated to the image-not-layout position, in region that is allocated to the second time unit defined by the calendar template;

a step of deciding a first image layout region to be allocated to the first image layout position, based on a region that is within the second image layout region and that is bigger than the allocation region for the first time unit defined by the calendar template, the region being obtained by merging a plurality of the allocation regions for each of the time units;

a step of deciding an allocation region for each of first time units that are before and after the second image layout position in terms of time, within the image-not-layout region;

a step of laying out information indicating the first time unit to the allocation region for each of the first time units;

a step of enlarging the image so that a size of the image matches a size of the first image layout region and laying out the enlarged image;

a step of outputting the calendar in which the information indicating the first time unit and the enlarged image are laid, a step of determining an output area of at least one of an output screen and an output medium for display of the calendar, and a step of adjusting at least a number and an area of the allocation regions based on the determined output area, wherein at least one of the number and area is increased as the determined output area increases.

3. The calendar outputting method according to claim 1, wherein the image layout region is decided so as to match a shape of the image.

4. The calendar outputting method according to claim 2, wherein the first image layout region is decided so as to match a shape of the image.

5. The calendar outputting method according to claim 1, wherein the size of the image layout region is decided according to a total number of the images to be laid on the calendar.

6. The calendar outputting method according to claim 2, wherein the size of the first image layout region is decided according to a total number of the images to be laid on the calendar.

7. The calendar outputting method according to claim 1, wherein, when image layout positions corresponding to a plurality of images are identical, the size of the image layout region to be allocated to the identical image layout position is decided according to a total number of the plurality of images.

8. The calendar outputting method according to claim 2, wherein, when the first image layout positions corresponding to a plurality of images are identical, the size of the first image layout region to be allocated to the identical first image layout position is decided according to a total number of the plurality of images.

9. The calendar outputting method according to claim 2, further comprising:

a step of enlarging the first image layout region so that sizes of regions allocated to each of the first time units become equal, when the sizes of regions allocated to the first time units in the second image layout region are not identical; and a step of additionally laying out an image other than the laid image to an extra region that is resulted from the enlargement of the first image layout region.

10. The calendar outputting method according to claim 9, further comprising:

a step of extracting a specific subject from the image; and a step of laying out the extracted specific subject to the extra region.

11. The calendar outputting method according to claim 1, further comprising:

a step of switching the output calendar and a usual calendar in which regions are allocated to all the time units according to the calendar template and in which the enlarged image is laid to the image layout position.

12. The calendar outputting method according to claim 2, further comprising:

a step of switching the output calendar and a usual calendar in which the regions are allocated to all the first time units according to the calendar template and in which the enlarged image is laid to the first image layout position.

13. A non-transitory recording medium on which a program is recorded, the program for causing a computer to execute the calendar outputting method according to claim 1.

14. A non-transitory recording medium on which a program is recorded, the program for causing a computer to execute the calendar outputting method according to claim 2.

15. A calendar outputting apparatus comprising:

a device which obtains an image;

a device which obtains a calendar template that defines an allocation region for each time unit on a calendar;

a device which decides an image layout position which is a time unit on the calendar to which the obtained image is to be laid;

a device which decides a pre-layout region which is a region allocated to each of time units existing before the image layout position in terms of time so that the pre-layout region matches a region allocated to time units existing before, defined by the calendar template;

a device which decides an image layout region which is a region to be allocated to the image layout position, in all of allocation regions defined by the calendar template, based on a region which is other than the pre-layout region and which is bigger than the allocation region for each of the time units defined by the calendar template, the region being obtained by merging a plurality of the allocation regions for each of the time units;

a device which decides a post-layout region which is a region allocated to each of the time units existing after the image layout position in terms of time, among the allocation regions for each of the time units on the calendar defined by the calendar template so that the post-layout region matches a region allocated to time units existing after the image layout region in terms of time;

a device which lays out information indicating the time unit to the allocation region for each of the decided time units;

a device which enlarges the image so that a size of the image matches a size of the image layout region, and laying out the enlarged image;

a device which outputs the calendar in which the information indicating the time unit and the enlarged image are laid, a device which determines an output area of at least one of an output screen and an output medium for display of the calendar, and a device which adjusts at least a number and an area of the allocation regions based on the determined output area, wherein at least one of the number and area is increased as the determined output area increases.

16. A calendar outputting apparatus comprising:

a device which obtains an image;

a device which obtains a calendar template that defines an allocation region for each of first time units on a calendar and an allocation region for each of second time units, the second time unit being an upper time unit that includes the first time unit;

a device which decides a first image layout position being the first time unit to which the obtained image is laid, and a second image layout position being a second time unit that includes the first image layout position;

a device which decides an image-not-layout region to be allocated to an image-not-layout position being a second time unit that does not include the first image layout position so that the image-not-layout region matches a region that is allocated to the second time unit defined by the calendar template;

a device which decides a second image layout region to be allocated to the second image layout position, based on regions except for region allocated to the image-not-layout position, in region that is allocated to the second time unit defined by the calendar template;

a device which decides a first image layout region to be allocated to the first image layout position, based on a region that is within the second image layout region and that is bigger than the allocation region for the first time unit defined by the calendar template, the region being obtained by merging a plurality of the allocation regions for each of the time units;

a device which decides an allocation region for each of the first time units that are before and after the second image layout position in terms of time, within the image-not-layout region;

a device which lays out information indicating the first time unit to the allocation region for each of the first time units;

a device which enlarges the image so that a size of the image matches a size of the first image layout region and lays out the enlarged image;

a device which outputs the calendar in which the information indicating the first time unit and the enlarged image are laid a device which determines an output area of at least one of an output screen and an output medium for display of the calendar, and a device which adjusts at least a number and an area of the allocation regions based on the determined output area, wherein at least one of the number and area is increased as the determined output area increases.

17. The method of claim 1, wherein the calendar template includes a two-dimensional matrix of allocation regions for plural time units, and wherein in deciding the post-layout region, allocation regions for plural time units existing after the image layout position in terms of time become merged for date compensation, wherein the merged date compensation allocation regions are arranged in one or more columns in the matrix.

18. The method of claim 17, wherein the matrix includes allocation regions corresponding to different days of a week across a row direction of the calendar template and weeks of a month in a column direction of the calendar template, and wherein the image layout region includes merged position allocation regions in the row direction and the column direction, and in forming the merged compensation allocation regions, dates of a month become sequentially numbered in the post-layout region in the merged compensation allocation regions and also in unmerged allocation regions so that in a week subsequent to the image layout region, allocation regions correspond to days of the week as if the image layout region were not bigger than other allocation regions to preserve day and date correspondence for time units existing after the image layout position in the matrix.

19. A calendar outputting method according to claim 1, further determining a photographed date of the obtained image based on associated tag information for the obtained image and applying a layout position for the obtained image based on the determined photographed date.

20. A calendar outputting method according to claim 2, further determining a photographed date of the obtained image based on associated tag information for the obtained image and applying a layout position for the obtained image based on the determined photographed date.

21. A calendar outputting apparatus according to claim 15, further comprising a device adapted to determine a photographed date of the obtained image based on associated tag information for the obtained image and device adapted to apply a layout position for the obtained image based on the determined photographed date.

22. A calendar outputting apparatus according to claim 16, further comprising a device adapted to determine a photographed date of the obtained image based on associated tag information for the obtained image and device adapted to apply a layout position for the obtained image based on the determined photographed date.

* * * * *